(12) United States Patent
Stark

(10) Patent No.: US 7,369,312 B2
(45) Date of Patent: May 6, 2008

(54) THIN LAYERED MICRO OPTICS POLARIZATION CONVERTER

(75) Inventor: Daniel Lee Stark, 1358 Pieice Ranch Rd., San Jose, CA (US) 95120

(73) Assignee: Daniel Lee Stark, San Jose, CA (US)

( * ) Notice: Subject to any disclaimer, the term of this patent is extended or adjusted under 35 U.S.C. 154(b) by 268 days.

(21) Appl. No.: 11/397,179

(22) Filed: Apr. 5, 2006

(65) Prior Publication Data

US 2006/0193048 A1    Aug. 31, 2006

Related U.S. Application Data

(63) Continuation-in-part of application No. 10/351,659, filed on Jan. 27, 2003, now Pat. No. 6,870,676.

(51) Int. Cl.
*G02B 5/30* (2006.01)
(52) U.S. Cl. .................. 359/495; 359/583; 359/584; 359/589; 359/487
(58) Field of Classification Search .................. None
See application file for complete search history.

(56) References Cited

U.S. PATENT DOCUMENTS

| | | | |
|---|---|---|---|
| 2,270,535 A | 6/1942 | Land | |
| 2,403,731 A | 7/1946 | MacNeille | |
| 2,868,076 A | 1/1959 | Geffcken | |
| 3,998,524 A | 12/1976 | Hubby | |
| 5,157,526 A | 10/1992 | Kondo | |
| 6,373,630 B1 | 4/2002 | Lee | |
| 6,870,676 B2 | 3/2005 | Stark | |

FOREIGN PATENT DOCUMENTS

JP    01265206 A  * 10/1989

* cited by examiner

*Primary Examiner*—Stephone B. Allen
*Assistant Examiner*—Derek S Chapel

(57) ABSTRACT

A thin optic electro magnetic radiation polarization converter, available in various combinations, used to convert non-polarized radiation into a single polarization state, which may be utilized in many devices requiring polarized radiation. A unique geometric configuration and positioning of optic layers that cause polarization separation by radiation concentration, reflection and polarization conversion utilizing birefringent materials to convert incident radiation to a linear polarization.

2 Claims, 10 Drawing Sheets

THIN LAYERED MICRO OPTICS POLARIZATION CONVERTER

CROSS REFERENCE TO RELATED APPLICATIONS

The present application is a continuation-in-part (CIP) of U.S. patent application Ser. No. 10/351,659, filed Jan. 27, 2003, now U.S. Pat. No. 6,870,676 all of which are incorporated herein in their entirety by reference.

STATEMENT REGARDING FEDERALLY SPONSORED RESEARCH AND DEVELOPMENT

All research and development associated with this invention has been performed using private funds. No federally sponsored research or development has been used.

BACKGROUND OF THE INVENTION

1. Field of Invention

The present invention relates generally to electromagnetic radiation polarization devices and particularly to conversion of unpolarized electromagnetic radiation to a desired linear polarization, using the geometries described in the present invention with applicability to LCD displays.

2. Description of Related Art

Unpolarized light is described by random orientation of the electric field vector perpendicular to the radiation direction of travel, and corresponding magnetic field vector orthogonal to both the direction of travel and the electric field vector. Linear polarized light is characterized by a spatially constant orientation of the electric field vector and corresponding constant scalar magnitude. Elliptically polarized light is characterized by a rotating electric field vector orientation as observed along the direction of travel and varying scalar electric field magnitude dependent on electric field vector orientation.

The early art separates unpolarized electro magnetic radiation into polarized components. Historically a method to separate linearly polarized light was by applying Malus's law. Malus discovered in 1809 that light could be partially or completely polarized by reflection.

U.S. Pat. No. 2,403,731 provides a classical early prism utilizing the multiple plates set at Brewster's angle, referred to as the MacNeille prism. MacNeille used seven layers of alternating high and low indices of refraction materials oriented to satisfy Brewster's angle to separate incident unpolarized light to a resultant linearly polarized light. The MacNeille prism further provides for the incident and exiting light to be normal to the prism's surface.

Another historical method to separate and produce linearly polarized light has been to use birefringent materials such as calcite. Birefringent materials at particular orientations exhibit differing indices of refraction, causing light transmitting through the crystal to be separated into two mutually perpendicular linearly polarized electric field vectors at different velocities and different refraction angles. The birefringent properties are utilized in U.S. Pat. No. 3,998,524, which provides a good, background and describes several prism types. One type of separator utilizes a polarization prism that also applies Brewster's law, and polarizes the incident light by total internal reflection of one of the two electric field vectors of the incident light at an interior surface, which is canted to the incident light at or beyond a selected critical angle. A second type utilizes a polarization prism, which transmits both electric field components of the incident light while physically separating them from each other at the output of the polarization prism in accordance to Snell's refraction law.

Some applications require separating the two orthogonal polarized electromagnetic radiations. One widely used technique for implementing this type of polarization prism is to cut one or more calcite crystals to form a Nicol or a Glan Thompson type prism. The resultant prism parts are then cemented together with an appropriate index of refraction adhesive. Another implementation of the calcite polarizer is to cement a layer of calcite or birefringent material between two glass prisms.

Other types of birefringent polarization prisms are the Wollaston and Rochon shearing polarizers. The polarizers produce two plane polarized, orthogonal, radiation paths with an angular separation between them at the same output surface of the polarization prism. In addition, the Wollaston polarizer disperses both polarizations of the incident light, and the Rochon polarizer yields only one half the angular separation of the polarized light beams of the Wollaston polarizer.

U.S. Pat. No. 2,270,535, Land et al., discloses a polarization converter comprised of a plurality of alternating layers where one layer is isotropic and the other alternating layer is birefringent. Furthermore the index of refractions and orientation of the birefringent layer is so selected that the index of refraction for the isotropic layer and birefringent layer is the same for electromagnetic radiation of a particular linear polarization, allowing the polarization to transit thru both layers of the optics without a polarization or direction change. The output is two linear orthogonal polarizations transmitted at different exit angles. Land further positions a phase rotator array to modify the polarization of one of the exit rays to match the other. Disadvantage of this approach is the theoretical maximum of 75% for a narrow pass band of the radiation, which can be converted to like linear polarization. A further disadvantage is that the optic requires precise angular positioning of the birefringent layer with respect to input radiation. A further disadvantage is the exact requirements for the angular positioning and birefringent properties, dramatically restricting the choice of materials. Similarly material selection of both layers is inhibited by the requirement that both layers exhibit the same index of refraction for the selected polarization. The design also invokes use of Brewster's law, which restricts the dynamic of the conversion process both in bandwidth and overall conversion efficiency.

U.S. Pat. No. 2,868,076, Geffcken et al., discloses a polarization converter utilizing a plurality of alternating layers where in one layer exhibits a high index of refraction relative to the second layer. The layers are angled relative to the incident radiation so that Brewster's law is satisfied where 100% of the incident radiation of a particular linear polarization is reflected from the interface between layers 1 and 2 and directed to exit the optic. The orthogonal polarization refracts at the layer's interface and is directed to a double refractive foil causing a half wavelength phase shift. The polarizations exiting the optics both match. The disadvantage of this optic is the complexity of structures and high mechanical tolerance demands. Further the optic is designed to operate at Brewster's angle, which restricts the bandwidth and total conversion efficiency. A further disadvantage is that the double refractive foil must be constructed to a precise thickness and relative orientation in order to rotate the incident light vector exactly half wavelength.

U.S. Pat. No. 5,157,526, Kondo et al., discloses a polarization converter utilizing a plurality of alternating layers where in one layer exhibits a high index of refraction relative to the second layer. The polarization converter efficiency is stated as 1.4 better than conventional, 40%, which is only improvement to 60% conversion. The layers are angled relative to the incident radiation so that Brewster's law is satisfied where 100% of the incident radiation of a particular linear polarization is reflected from the interface between layers 1 and 2 and channeled down layer 1. The orthogonal polarization by Brewster's law is 100% transmitted into the second layer. The second layer is selected to be of birefringent material of a thickness along the ray trace to cause a half wavelength electric field rotation exactly half wavelength. Thus half of the exiting radiation's polarization agrees with the radiation channeled down the first layer. Disadvantages of this invention are that the maximum theoretical efficiency for one interaction is 75% at a narrow pass band and the conditions of Brewster's law must be satisfied. A further disadvantage is that both alternating layers are selected to be birefringent materials, restricting the material selection. A disadvantage is that the birefringent layer must be constructed to a precise thickness and positioned to an exact orientation in order to rotate the incident light vector exactly half wavelength. The precision fabrication requirements drive up assembly costs and restrict the selection of materials. U.S. Pat. No. 5,157,526 Kondo, et al utilizes two reflections, but the design uses a single pass of the radiation's electric vector rotation, which automatically restricts maximum efficiency to 75%.

SEIKO EPSON (JP 01-265206) discloses a optic of isotropic and birefringent materials where the a birefringent layer causes the unpolarized input radiation to be split into two components at diverging angles, and focused via a micro-lens array onto an array of focus spots with mutually orthogonal linear polarization. Because the incoming radiation has different incoming angle onto the micro lens array, the lens produces an array of focus spots that are alternately orthogonal polarizations. A micro-array of phase shifting plates is positioned to rotate a set of focus points with like linear polarization to match the linear polarization of the other set. The main disadvantage of this approach is the complex high tolerance arrays, which drive fabrication costs up. Casting a polymer, which restricts the applications, best produces the lens array. The maximum theoretical efficiency is only 75%.

Other polarization schemes that strive to convert the entire incident electromagnetic radiation into a single polarization have been referred to as doublers. U.S. Pat. No. 6,373,630 describes a polarization doubler. A polarization splitter film and a phase retardation film are used to focus and refract the incident radiation with an under plate. The radiation transiting the under plate, goes through a series of optical processes of polarization splitting, reflection, total reflection, phase retardation, and subsequently becomes radiation of a single polarization state output. A major disadvantage is a complex micro optic structure requiring precision manufacture, which results in a high manufacturing cost. The complex micro optic is best produced from a cast or plastic material, which limits the application capabilities. The doubler is only targeted for use with LCD projectors, and does not provide a generalized design for other applications such as automobile headlight blinding prevention where the headlight output radiation is linearly polarized at 45 degrees from vertical in order to allow polarization discrimination by oncoming drivers or pedestrians viewing through a similarly polarized film. The design does not lend itself well to miniaturization, required in the fiber optics applications.

U.S. Pat. No. 6,870,676, Stark, describes a layered polarization converter where in layers of high index and low index materials are arranged in a layered stack, with the high index material being birefringent. Radiation upon entering the edge of these layers has one linear polarization preferentially channeled through the low index of material, while the other orthogonal polarization is selectively refracted through the high birefringent layer and partially converted to the other linear polarization while transiting through the high index polarization. Successive interactions cause the exiting polarization to be mostly converted into a single linear polarization. The optic is designed for wide band application, not requiring specific wavelength retardation coatings. The optic also prefers several interaction layers unlike the previous patents and functions at angles other than Brewster's angle.

SUMMARY OF THE INVENTION

The first object of this present invention is to provide a structure that utilizes the concept taught by U.S. Pat. No. 6,870,676, Stark, but can be made much thinner than the structure offered in that patent. Thus the first object of this invention is to provide a concept where in a polarization converter optic may be constructed particularly thin, on the order of 0.030 inches thick. Thinner or thicker versions are also possible because the design scales to the desired thickness. The second object of the present invention is to provide a wide band electromagnetic radiation polarization converter to convert said radiation into a desired polarization state, and to convert the radiation at high efficiencies. To achieve polarization conversion, this invention provides a micro optical component constructed in a plurality of layers with the layer materials selected for their optical properties. The input and output optic major apertures are the sum of the micro-optic apertures constituting the edges of the layers. The layered micro optical components utilize in various combinations or singularly the advantageous properties of: off axis optical focusing, cylindrical lens focusing, birefringent materials, Snell's law of reflection and refraction and Malus's discovery that light can be polarized by reflection. This invention offers wide band polarization conversion with efficiencies greater than 80% for wide bandwidths and higher for narrower bandwidths.

The second object of this invention is to provide a design that can be inexpensively manufactured. Inexpensive manufacture is afforded because of a simple, unique and easily constructed assembly of layered optics. The optic performs polarization separation and conversion without the requirement for precise half wavelength retarder plates. No precise wavelength dimensions are required for the layers. One version restricts the birefringent layer to as thin as possible relative to the other layer to avoid input losses. The other version restricts the non-birefringent layer to be as thin as possible. Similarly, the birefringent layer does not require precise orientation of the index of refraction axis, but can be preferentially randomly oriented.

The third object of this invention is to provide an electromagnetic radiation polarization converter that can be manufactured from a wide range of materials allowing inexpensive materials and or rugged materials able to withstand a chosen environment. The invention may be constructed from a wide range of materials that include polymers, mineral crystals such as mica, quartz, and calcite.

Therefore, the optic may be designed to withstand the environment, for example high temperature, or low cost.

The fourth object of this invention is to provide a polarization converter that can be used on many applications. This invention applies to a wide range of applications requiring polarized light such as LCD projectors, LCD displays, fiber optics communications, and applications such as linear polarization of headlight illumination to 45 degrees. The invention can be manufactured of a form with flat entrance and exit surface apertures, curved, or doubly curved while maintaining a low volume. The invention can be manufactured as a small component for applications restricting size. This invention can be manufactured to convert wide bandwidths or narrow bandwidths at very high efficiency.

BRIEF DESCRIPTION OF THE DRAWINGS

The nature of this invention is to convert electromagnetic radiation into a selected polarization state. This invention provides significant advantages for many applications requiring polarized electromagnetic radiation. The present invention can be clearly understood from the following descriptions of the preferred embodiments in conjunction with the accompanying drawings, wherein.

DETAILED DESCRIPTION OF THE INVENTION

Figure 1:
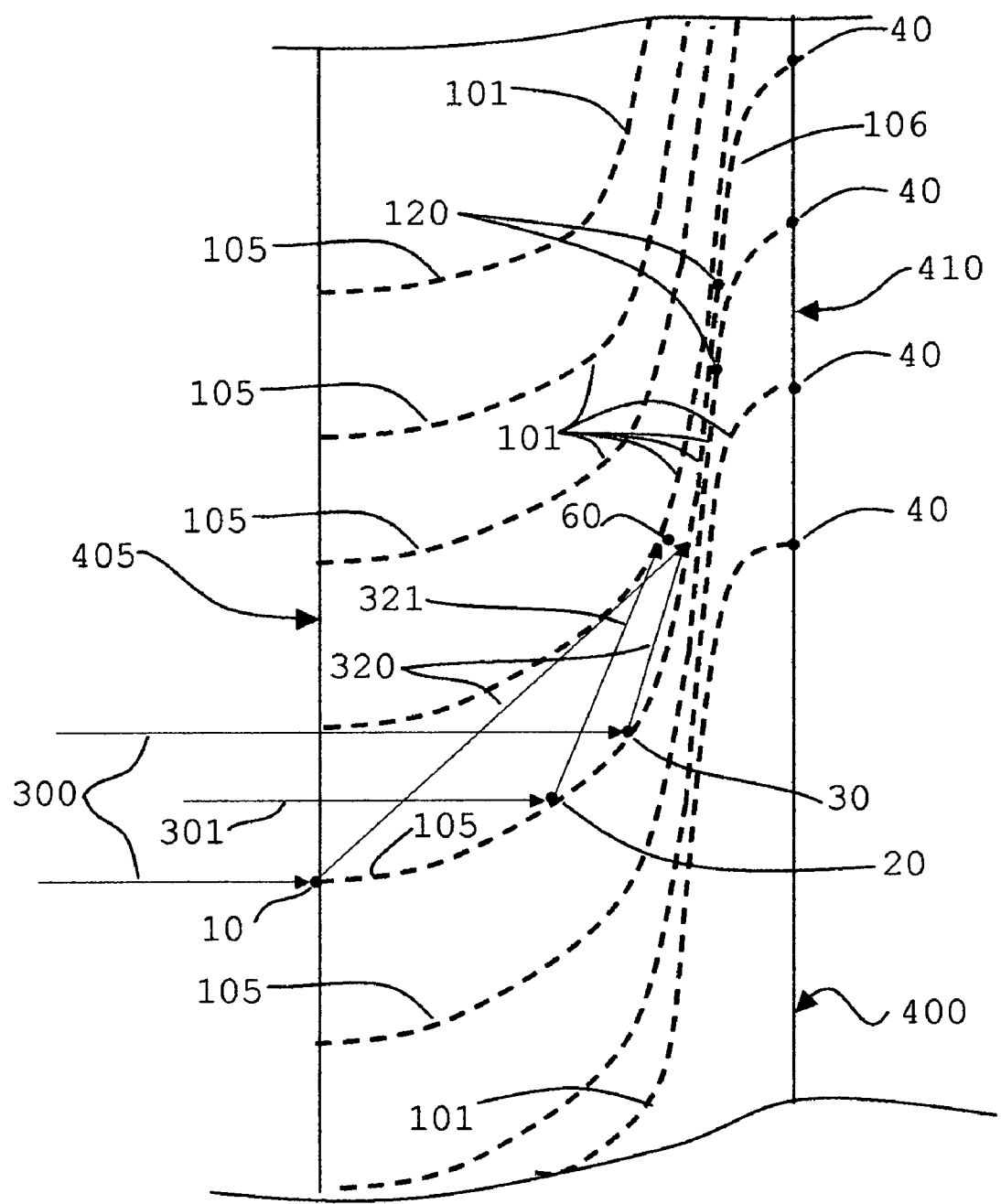
FIG. 1 is side view cross section of the preferred embodiment showing the arrangement of the layers that focus, convert and exit the polarized radiation.

FIG. 1 Detailed Description

FIG. 1 shows a side view of the preferred embodiment, 400, wherein the geometrical arrangement of birefringent layers 101 are shown. The entrance aperture is formed by the surface 405 and is positioned near perpendicular to the incoming unpolarized radiation. The surfaces 405 and 410 form the entrance and exit aperture plane. The optic 400, preferred embodiment does not have a window, thus surfaces 405 and 410 are geometrical locations only. As an option 405 and 410 may be formed from a thin sheet of glass or polymer. The Anti Reflective coating can be applied prior to assembly on any of the window sides, 405 or 410.

One section of the entrance aperture is shown as formed by the space between two layers 101 with the incident rays 300 at the edges of the entrance aperture, and 301 being the central ray. The preferred embodiment causes the incoming radiation, 300,301, to be reflected from surface 105 and be directed toward the surface of layer 101 near location 60 so as to be at an optimum polarization conversion angle with respect to the reflection refraction interaction with layers 101. Note this point can be a focus, but is optimally not a focus point, but a out of focus condition wherein the angle the reflected radiation strikes either layer, 101 are specifically designed to strike layer 101 at a specific angle. The shape of 105 reflectors, which is a subsection of the layer 101, is designed to cause the reflected rays 320 and 321 to strike the layer 101 near five degrees incidence as optimal. The entrance aperture 405 shows ray trace for the incident radiation 300 and 301. Greater angles will reduce the polarization efficiency more rapidly than shallower angles.

FIG. 1 shows a geometrical positioning side view of the thin sheets, 101, that are of a birefringent nature and having a high index of refraction surface are shown as 101. The thinner the sheets, 101, the more optimum the design as long as the structural requirement are satisfied which is sufficient strength and rigidity to span the full width of the optic 400 as well as sufficient birefringent path length of refracted radiation thru the layer 101 to cause the polarization to be modified. Polymers are highly birefringent, and are selected as the preferred embodiment. However, minerals such as calcite, mica are of a birefringent nature.

FIG. 1 shows the edges of layers, 101, behind the optic frame 400, and thus is shown as dotted lines. The spacing of the layers 101 are separated at the entrance aperture in a form to allow the incoming radiation 300 and 301 to impinge on a surface 105 which is a subsection of the layer 101 bound between points 10, 20 and 30. The surface of 101 bound between 10 and 30 forms an off axis reflector to cause the incident radiation 300, and 301 to be directed in a manner to be at a polarization conversion angle to the two 101 layers near the point 60. Thus the surface 101 between 10 and 30, referred to as 105 is treated with a reflective material to cause the incident radiation to be directed to an area around point 60. The area 105 need not be treated with a high index material, and alternately may be a separate structure from layer 101. The reflector bound by points 10 to 30 on 101 act in a manner similar to an off axis cylindrical parabola. This reflective area is shown as 105, which forms a cylindrical micro optic collector and reflector.

The spacing of elements 101 is much closer together between the points 60 and 120. In fact the spacing only needs to allow the radiation to not be obstructed. The nature of the 101 layers being non-flat allows the layers to be unfastened in this region, but naturally maintain a gap sufficient to allow the electromagnetic radiation to transverse to the exit aperture. The great advantage in allowing the layers 101 to be closely spaced in the region between points 60 and 120 is reducing the overall polarization conversion length required, and thus the optic thickness.

The layers 101 form an exit aperture described by the surface bound between 120 and 40. The surface between 120 and 40 is treated with a reflective material to cause the radiation to exit at the desired columniation or divergence. The surface of 101 bounded by the points 40 and 120 is shown as 106. The channeled radiation between successive layers, 101, is directed to the exit aperture reflector, 106, which is treated with a reflective material and shaped in a manner to output the desired radiation pattern in a divergent or collimated state as desired. The micro optic, 106, at the exit aperture is of a cylindrical off axis parabolic nature. FIG. 1 shows a side view of the optic with a frame 400. Frame 400 is fashioned to provide the groves for layers 101 between points 10 and 30 to form the desired optical collection and reflection entrance apertures. Similarly groves are fashioned in frame 400 between points 120 to 40 to form the desired exit aperture reflective surface. Surfaces between 10 and 30, as well as between 120 and 40 act in a manner similar to an off axis parabolic reflector. An alternate design, not shown, is to provide for spacers between the sheets that form the desired reflector shape.

The frame between 101 points 30 and 120 are free of groves, allowing the layers 101 to float. The birefringent layer 101 can be free, but not block the channeled radiation. The 101 optic length between 60 and 120 is the active area where polarization conversion occurs, as described in described in U.S. Pat. No. 6,870,676, Stark. The advantages of the preferred embodiment are to provide an optic where the entrance aperture 405 and exit aperture 410 are close together to form a thin polarization conversion optic. Further advantages from this design is reducing the number of required layers by constructing both the entrance aperture and exit apertures much wider distance between adjacent layers 101 as compared to the distance between layers 101 in the active polarization conversion area, shown as between points 60 and 120 on layer 101. The material in the preferred embodiment between layers 101 is air. Alternate designs to the preferred embodiment are making layers between layers 101 to be that of a specific gas, or liquid, or transparent aero gel. The simplest design is no specific layer between the layers 101, which is naturally filled by air. The entrance and exit apertures do not require AR coating for optimum performance.

An alternate design constructs 405 and 410 to be a thin window of polymer or other transparent material to act as a protective cover, and/or contain the gas or liquid alternates between 101 layers. The window may or may not be AR coated.

Figure 2:
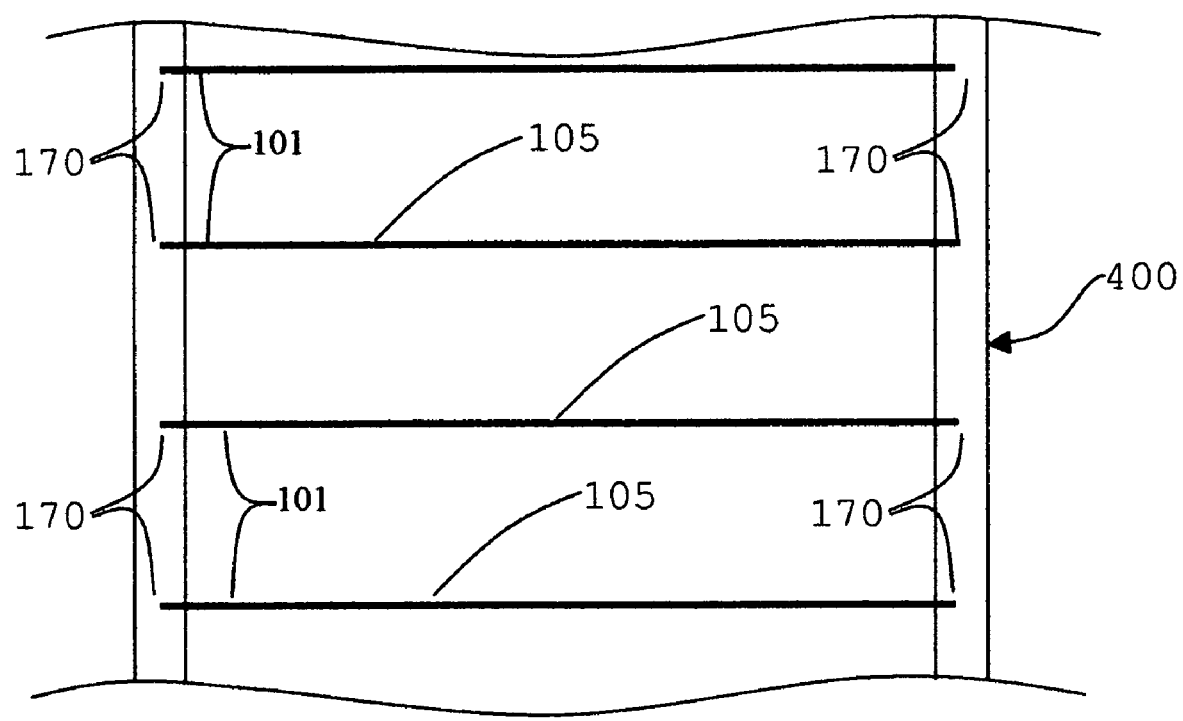
FIG. 2 is a front view of the preferred embodiment, which is the entrance aperture showing the method the birefringent layer is positioned and fastened in the optic's frame.

FIG. 2 Detailed Description

FIG. 2 shows a section of the optic's entrance aperture. The optic collector layer, 105 have their edges shown as an edge on view. The frame 400 provides guides, 170, to form the shape of 105 at the entrance aperture reflective surface on layer 101. Therefore as shown edge on, 105 is the same as 101. The reflector section 105 is part of the larger layer 101.

The guide 170, is formed in a like manner at the exit aperture. An alternate design, not shown, is to provide spacers between the reflective collectors sheets. The layer 105 may be adhered inside or at the edge of the grove with an adhesive; however, the adhesive material is not required if the layer 105 is of sufficient rigidity to maintain position, as in the preferred embodiment. The preferred embodiment selects very thin layers of 105, which is a subset of the birefringent layer 101, in order to minimize the edge on loss of radiation that enters the ends of 101. Alternate methods can be fashioned in frame 400 to hold the layers 101 such as shoulders; however, a guide is optimum because it fully captures the 101 layers.

Figure 3:
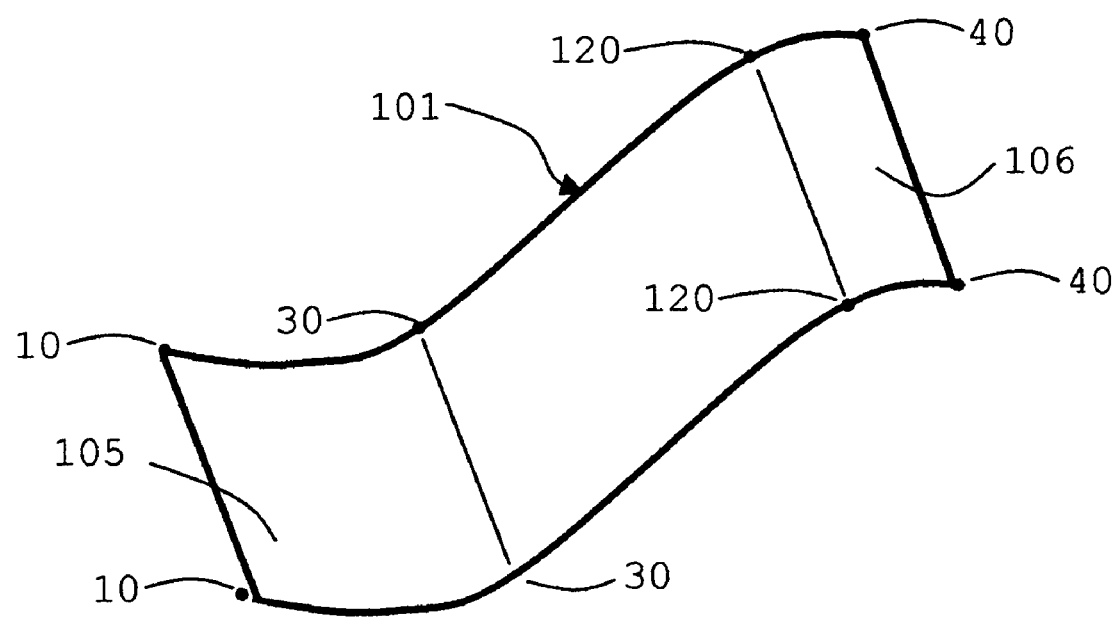
FIG. 3 shows the preferred embodiment of a single birefringent layer prior to installation into the optic, with the reflective surfaces at both ends and polarization conversion section in the center, coated with high index of refraction material in the center.

FIG. 3 Detailed Description

FIG. 3 shows an isometric drawing of a single birefringent layer 101 prior to installation. The preferred embodiment of 101 is a sheet of polymer that exhibits a high index of refraction, is highly transparent, and possesses birefringent capability polymer sheet is coated with highly reflective coating on the ends shown as 105 between points 10 and 30, as well as area shown as 106 between points 120 and 40. The areas 105 and 106 only need be reflective, not birefringent. The reflective 106 is on the bottom of the layer 101 as shown in the isometric drawing, whereas the reflective area 105 is on the top of the isometric rendition of 101. The reflective surface 105 acts to direct the incident radiation to the polarization conversion area, which is between points 30 and 120. The layers 101, between points 30 and 120 are coated with a high index of refraction, transparent coating on both sides. The preferred embodiment uses aluminum for the coatings to form 105 and 106 with a protected corrosion coating, but other reflective coatings are possible such as silver, or dielectric coatings. The sheet 101 between the points 30 and 120 is preferably coated both sides with TiO2. TiO2 is selected because it is a common use, high index of refraction and high transparency to the visible. However, the higher the index of refraction, the more efficient the optic. Dielectric materials, and less than a wavelength thick coatings of metals offer higher index of refraction surfaces and alternate coatings. Coatings such as indium phosphide, gallium arsenide are examples of high index materials. Other examples are ZrO2, WO3, ZnO, Ta2O5, CeO2 and Bi2O3.

The layer substrate 101 is preferentially a high index material that is birefringent. However, higher efficiencies can be achieved by coating a birefringent polymer or copolymer with a higher index of refraction material than the 101 substrate. The preferred embodiment of 101 coats a polymer sheet substrate with TiO2. The surfaces of 101 need be smooth in order to have mostly specular reflection. Flat is not as critical.

Polymers are highly birefringent, and have achieved index of refractions of 1.8. The surface of 101 in the active polarization conversion area is preferred to be in the minimum index of refraction of 2.1, but the higher the more efficient the optic. The birefringent layer 101 may be a uniaxial polymer sheet such as Dupont Mylar, or a composite material comprising platy crystals such as guanine or guanidine compounds embedded in an isotropic polymer matrix. The crystals oriented randomly. Materials can also be doped in the polymer layer 101 such as nano powders of TiO2, ZnO, indium phosphide, gallium arsenide are examples. Nano powders doped into a polymer increase the index of refraction without causing dispersion. Brewer reports a new class of amorphous aromatic polyetherimides that possess high refractive indices of 1.62 to 1.78 at visible wavelengths. These polymers also have high glass transition temperature greater than 225° C., thermal stability to 400° C. with good mechanical strength.

Figure 4:
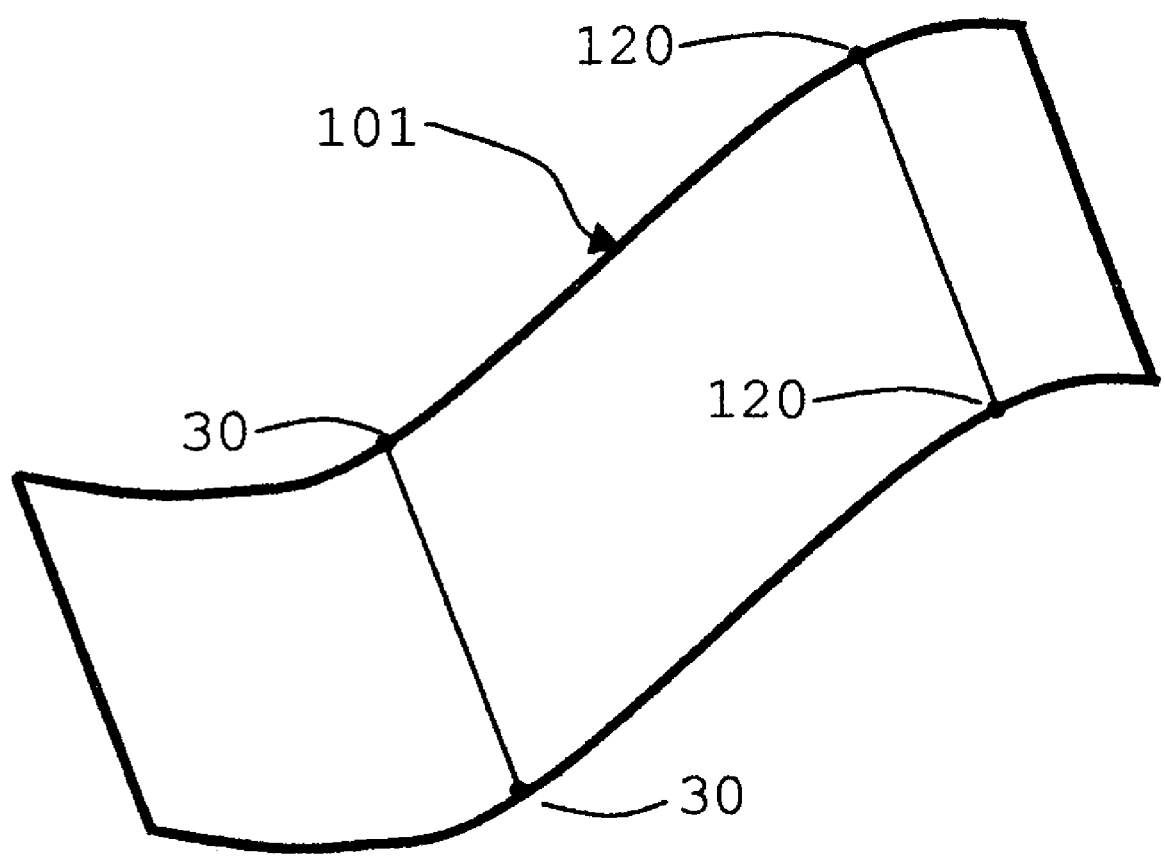
FIG. 4 shows an alternate design of a single birefringent layer prior to installation into the optic, with the reflective surfaces at both ends and polarization conversion section in the center, and the center not coated with high index of refractive material rather utilizing the intrinsic high index from the birefringent layer.

FIG. 4 Detailed Description

FIG. 4 shows an alternate design for the layer 101. The layer, 101, is not coated between points 30 and 120. The region on 101 between 30 and 120 form the polarization conversion region where the channeled radiation interacts with adjacent 101 layers in the assembled optic. This alternate design relies on the intrinsic index of refraction of the polymer to achieve polarization conversion. A concept is an optically transparent polymer or copolymer such as FEP, ETFE, Teflon AF doped with micro powders of high index materials such as TiO2. Other micro powders may be used, or dielectrics. Nano powders of metals when thoroughly mixed in the polymer will also achieve high index polymers. Prototoype materials have currently achieved index of refraction of 2.1 by mixing Titania into a polymer.

Figure 5:
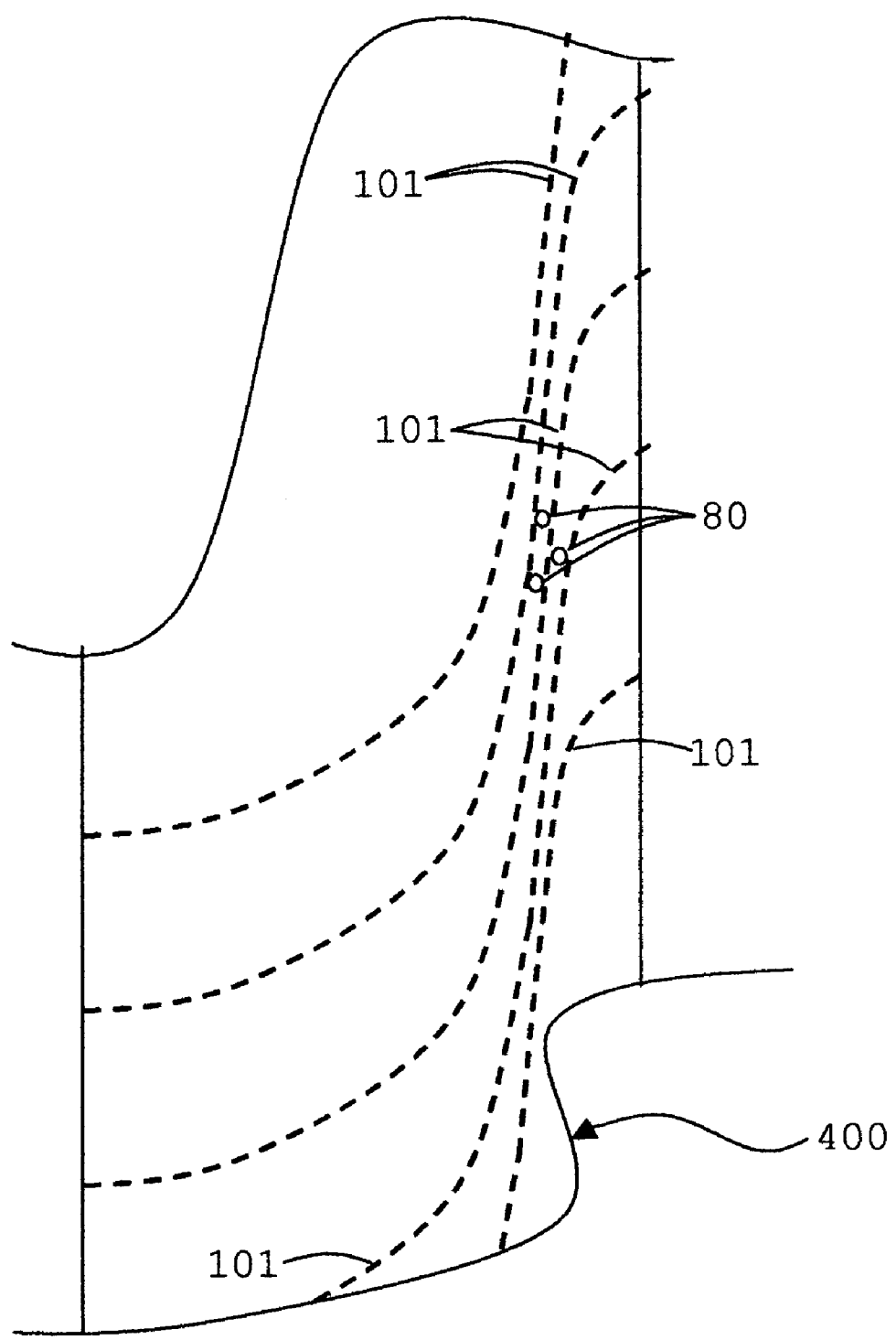
FIG. 5 is side view cross section of an alternate design showing the arrangement of the layers that focus, convert and exit the polarized radiation with the addition of micro spacers between the birefringent layers.

FIG. 5 Detailed Description

FIG. 5 shows the optic 400 with micro spacers positioned between layers 101 and labeled 80. The potential for micro spacers, 80, is an alternate design to the preferred embodiment. The micro-spacers accurately control the space between the layers, 101, and allow the optic to become a monolithic structure. A low index of refraction material is preferred for 80, such as glass developed by both Corning and Hoya. The material should not exhibit birefringence or scattering characteristics. The shape of the micro spacers is not critical, but spherical is the optimum shape for distance uniformity with least volume. Micro beads are commonly used to control adhesive thickness. The micro spacers may be arranged randomly or by fixed pattern. The micro spacers are fixed to one or both sides of the layer 101 in the active polarization conversion region. The preferred alternate embodiment only fixes the micro spacers to one side of each 101 layer, and only in the polarization conversion region.

Figure 6:
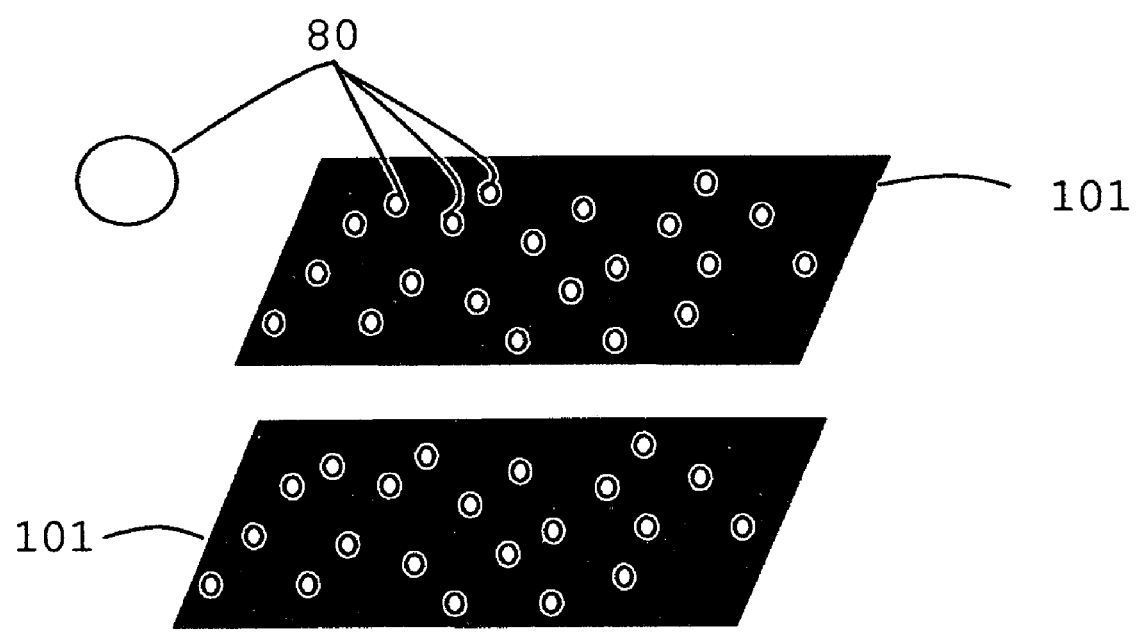
FIG. 6 is an alternate design wherein the layers are shown as flat plates separated with micro spacers.

FIG. 6 Detailed Description

FIG. 6 shows two flat birefringent sheets in an isometric drawing separated to show the array of micro beads, 80, interspaced over the surface between the birefringent layers 101, and maintaining a known separation between adjacent 101 layers. The micro beads serve to maintain a micro positioned gap between the birefringent layers. The gap acts as the channeling space with an index of refraction of the material in the gap, which may be a gas, a liquid, or air. Air is selected because it represents the simplest design with no intervening layer. One micro bead, 80, is shown enlarged in the preferred shape of a sphere. The micro beads, 80, are randomly spaced between layers 101, but can be alternatively spaced in patterns.

Figure 7:
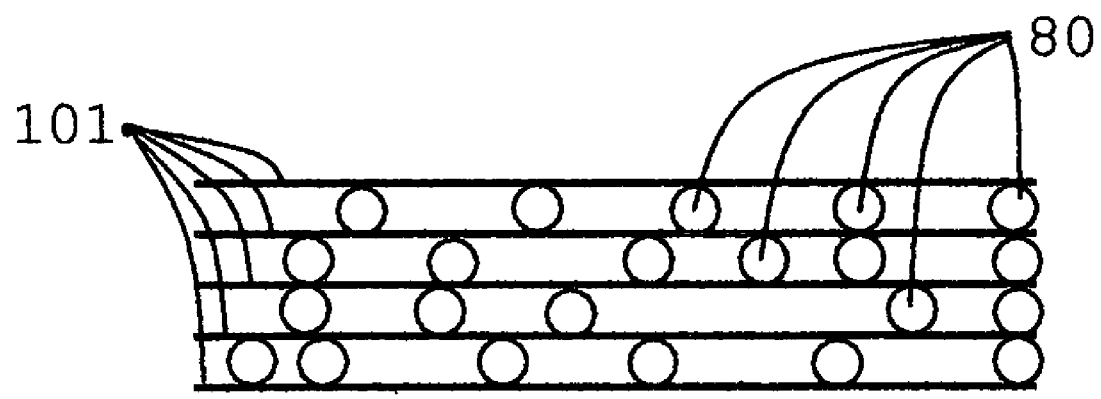
FIG. 7 is an front aspect view of the alternate design shown in FIG. 5 which is a flat plate birefringent layer separated by micro beads.

FIG. 7 Detailed Description

FIG. 7 is an end view of the isometric first presented in FIG. 6. The layers 101 are fastened and separated from each other by a series of micro bead spacers, 80, between the layers 101. The micro bead approach allows the low index layer to be much thinner that a solid drawn glass.

The above descriptions are illustrative examples of the preferred embodiment of the polarization converter with some alternate design approaches. Any modifications or amendments, which may be achieved by those skilled in the art, are within the scope and spirit of the present invention. Any combinations, which differ from the examples given, are within the scope and spirit of the present invention. The scope of the invention is defined by the claims.

Figure 8:
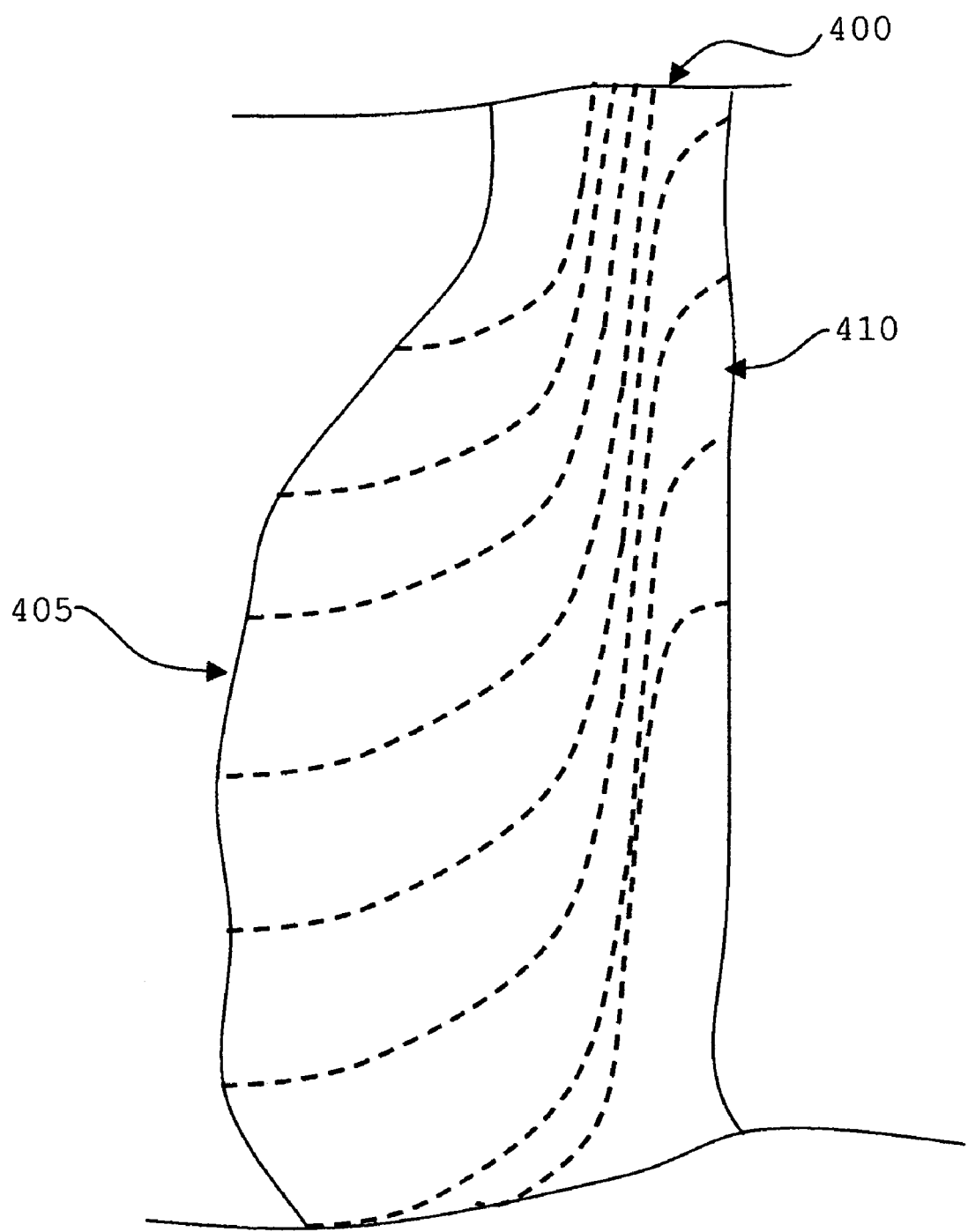
FIG. 8 is an alternate design wherein the entrance and exit aperture surfaces are curvilinear.

FIG. 8 Detailed Description

FIG. 8 is a preferred embodiment, 400, wherein the entrance apertures 405 and exit apertures 410 are not parallel but both form curvilinear lines in free form.

Figure 9:
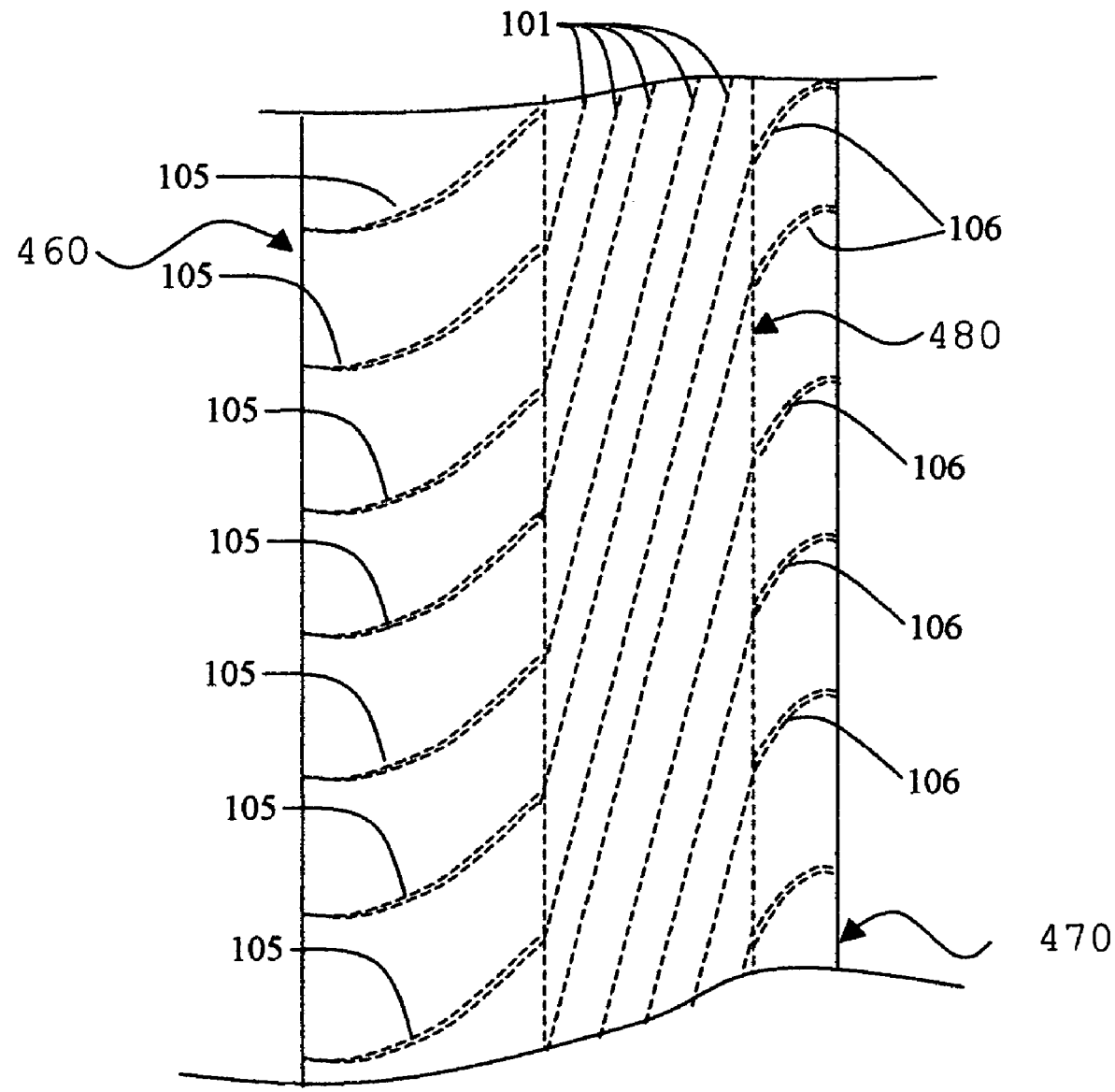
FIG. 9 is an alternate design of the preferred embodiment wherein the entrance aperture with imbedded reflectors is a separate unit, the birefringent layers are a separate unit, and the exit aperture with imbedded reflectors are a separate unit.

FIG. 9 Detailed Description

FIG. 9 is an alternate construction to the preferred embodiment wherein the entrance apertures form a separate unit, 460. The reflective surfaces, 105, in the entrance aperture can be formed of metallic or polymer strips embedded into the entrance aperture unit, and properly surfaced for radiation collection and reflection. The radiation is delivered to the birefringent conversion and channeling structure shown as layers 101, and as a monolithic unit 480. Similarly the exit aperture unit, 470, with reflective surfaces 106 can be formed by a single unit, embedding the 106 reflectors. The form of the entrance and exit apertures may be a solid transparent with the reflectors embedded, or a frame unit supporting the reflectors 105 and 106. The active polarization conversion area, unit 480, is tilted to accept the off axis reflected electromagnetic radiation collected by 105, and directed to the conversion area, then exiting as directed by reflector 106. The form of 101 layers may be flat or of curvilinear nature, not shown. The form of the collection and exit units thus form a micro optic array.

Figure 10:
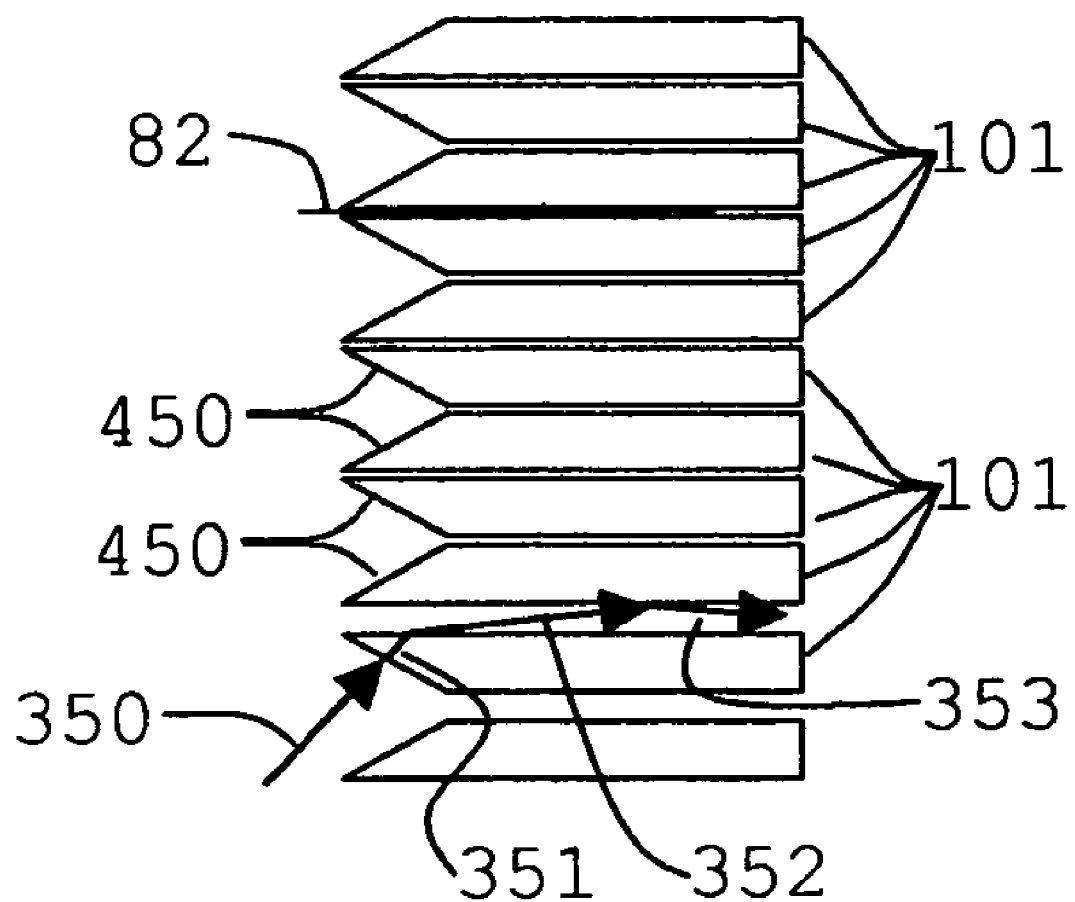
FIG. 10 is an alternate design of the preferred embodiment wherein the entrance aperture is the high index layer rather than the low index layer, and entrance aperture formed by a canted surface as part of the high index birefringent layer, and the high index is much thicker than the low index layer.

FIG. 10 Detailed Description

FIG. 10 is a side view cross section of an alternate design. FIG. 10 is an alternate construction to the preferred embodiment wherein the high index layer, 101, is constructed as a thick substrate as compared to the low index layer, and the high index material has in addition a canted surface, 450, with respect to incoming radiation, 350. The incident radiation 350 is refracted from the surface of 450, refracted radiation shown as 351. The distance between 101 layers is exaggerated where ray traces 350, 351, 352 and 353 are shown. The incoming radiation, 350 refracts with the 101 surface 405 and is shown as 351. The 351 radiations when interacting with 101 surfaces both refract and reflect. The ray 353 is predominately of the favorable polarization and is channeled between layers 101 to exit. The radiation 352 is predominately the unfavorable polarization and transits the 101 layers for polarization mixing to again interact with the 101 surfaces. The separation between layers 101 is controlled by a shim, 82 placed at the end of the optic, which is a construction of multiple 101 layers. The 101 layers may further be fitted in a frame, or the 101 layers fixed to each other via an adhesive applied to the 82 shim. At optimum design the spacing between 101 layers, controlled by 82, is minimized to be less radiation reflection distance than the similar reflection inside the 101 layers. The spacing of 82 need only be several wavelengths, more dependent on 101 surface flatness. The 101 layers may also be coated with a high index surface treatment both major sides such as TiO2 in order to increase the polarization efficiency.

The layer, 101, as an optimum construction is a high index polymer doped with Titania nano powder which raises the index of refraction above two. The polymer layers can be cast, allowing low manufacturing costs. However as an option the layers 101 may be constructed of a high index translucent glass or mineral. The layers 101 may also be arranged in the same orientation rather than back to back as shown.

A spacer, 82, is shown partially pulled out between two adjacent layers, 101. The spacers 82 are installed at the edges of each layer 101 to control the thickness between 101 layers, and construct a monolith unit with the addition of an adhesive between respective 82 and 101 components. The spacer, 82 is only shown between one adjacent layer, 101. Alternate geometrical arrangements, not shown, are high index layer substrate squares, rectangles or fiber bundles with a canted surface at the entrance aperture as part of the substrate end, and the spacing between the high index arrangement acting as the channeling layer. As an option, not shown, a collimating cylindrical or beam-forming lens may be placed at the exit apertures between layers 101. Another option is to coat the layers 101 with high index of refraction material.

What is claimed is:

1. A polarization converter for converting electromagnetic radiation from a source into electromagnetic radiation having a prescribed polarized radiation state, said radiation source providing electromagnetic radiation resolvable into a two mutually orthogonal linear polarization states, comprising:

a plurality of alternating layers, the plurality of alternating layers including at least two layer types, one layer type having at least one of a high refractive index and birefringence, and polarization scattering capability, as compared to the other layer types, and one layer type having at least a low refractive index and no birefringent capability, as compared to the other layer types, the alternating layers having the at least one of a high refractive index and birefringence, and polarization scattering capability being adjacent at least one non-birefringent layer of low refractive index in an alternating arrangement of layer types defining interfaces between the layer types, the interfaces being arranged at an angle with respect to incoming electromagnetic radiation such that both reflection and refraction occurs at the interfaces, with one linear polarization state being preferentially reflected at the interfaces between layer types, with orthogonal polarization states being preferentially refracted at the said interfaces, one edge of each alternating layer being adjacent at an entrance aperture or adjacent to a micro-optic collector, the entrance aperture thus comprising a series of adjacent micro-optic entrance apertures, each defined by a cross-section of an alternating layer at the entrance aperture, or series of micro-optic collectors, one other edge of each alternating layer also being adjacent an exit aperture or series of micro-optic reflectors, the exit aperture thus comprising a series of adjacent micro-optic exit apertures, each defined by a cross-section of a layer at the exit aperture, or a micro-optic reflector, with said low and high refractive indices being related so as to cause polarization separation, reflection, refraction, and channeling of said two mutually orthogonal linear polarization states, and where at least one layer is a radiation conduit favoring reflection of a selected polarization state and transmitting radiation to the exit aperture, and where at least one layer is a radiation polarization converter causing refracted radiation to be of randomized electric field radiation vectors, and to refract said refracted radiation out of a major side of the layer having at least one of a high refractive index and birefringence, and polarization scattering capability into an adjacent non-birefringent layer, with at least one of a high refractive index and birefringence, and polarization scattering capability being constructed and randomly positioned with respect to the birefringent electric field radiation vector rotation of desired polarization states, with, for optimum polarization conversion performance, the said angled layers are angled at angles other than Brewster's angle with respect to incident radiation utilizing more than one reflection refraction interaction, in accordance with Malus's law, and the multiple reflection refraction interactions providing higher conversion efficiency than available with orientation at Brewster's angle with two or less reflection refraction interactions, with said polarization converter optimizing polarization conversion using greater than one reflection refraction interaction between said layer types, with said optic polarization efficiency being dependent on the number of reflection refraction interactions, so selected and optimized by the optic distance between layers, wherein said layers are positioned in a curved geometrical position allowing the spacing between said layers to be increased or decreased and allowing said layers to change the direction of channeled radiation, wherein at least one or more of said layers is formed of a material selected from the group consisting of air, liquid, gas and aero gel, wherein the spacing between said birefringent layers is geometrically positioned to approach a variable and minimum distance only supporting radiation reflection and refraction from said adjacent layer surfaces, wherein said high index layers are floating in the polarization conversion region, wherein an electromagnetic radiation collection micro-optic, comprising a reflective coating, is formed and positioned at the entrance aperture to act to collect, reflect, direct and concentrate the incoming radiation into the polarization conversion optic area, wherein a micro-optic, comprising an additional reflective coating, is formed and positioned at the exit aperture to reflect the channeled radiation out of the optic in a collimated or divergent state.

2. The polarization converter of claim 1, comprising:

the polarization converter further selects at least one of said alternating layers to be selected from the group consisting of a gas, liquid and aero gel, with said layers held in position by micro-spacers, wherein, the polarization converter, further uses micro-spacers positioned between said high index layers, wherein, the polarization converter, further includes entrance and exit aperture windows positioned at the said entrance and exit apertures, wherein, the polarization converter, further treats the entrance and exit aperture windows with an anti-reflective coating on at least one window surface, wherein, the polarization converter, further comprises at least one layer composed of a high index of refraction material with birefringent capability of sufficient thickness to cause polarization change by electric field vector rotation.

* * * * *